US007461969B2

(12) United States Patent
Hoerle et al.

(10) Patent No.: US 7,461,969 B2
(45) Date of Patent: *Dec. 9, 2008

(54) METHOD AND APPARATUS FOR ON-SITE MIXING OF LIQUID DEICER

(75) Inventors: Michael Hoerle, Eden Prairie, MN (US); Lawrence L. Micek, Woodbury, MN (US); Donald T. Ireland, Delano, MN (US)

(73) Assignee: Cargill, Incorporated, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/614,660

(22) Filed: Dec. 21, 2006

(65) Prior Publication Data

US 2007/0177456 A1  Aug. 2, 2007

Related U.S. Application Data

(63) Continuation of application No. 10/302,759, filed on Nov. 22, 2002, now Pat. No. 7,168,844.

(51) Int. Cl.
*B01F 13/00* (2006.01)
*C09K 3/18* (2006.01)

(52) U.S. Cl. .............. 366/162.4; 106/13; 239/310; 252/70; 366/172.1; 366/173.1; 366/348

(58) Field of Classification Search .......... 106/13; 252/70; 366/162.4, 348, 172.1, 173.1; 239/310
See application file for complete search history.

(56) References Cited

U.S. PATENT DOCUMENTS

| | | |
|---|---|---|
| 2,716,068 A | 8/1955 | Fain et al. |
| 3,502,304 A | 3/1970 | Pfrengle |
| 3,776,775 A | 12/1973 | Lazarus |
| 4,191,348 A | 3/1980 | Holwerda |
| 4,474,310 A | 10/1984 | Muller et al. |
| 4,474,476 A * | 10/1984 | Thomsen .............. 366/152.4 |
| 4,573,802 A | 3/1986 | Kerrigan et al. |
| 4,855,071 A | 8/1989 | Todd, Jr. et al. |
| 5,011,293 A * | 4/1991 | Roop et al. .............. 366/162.4 |
| 5,028,017 A | 7/1991 | Simmons et al. |
| 5,064,551 A | 11/1991 | Smith |
| 5,104,562 A | 4/1992 | Kardos et al. |
| 5,219,483 A | 6/1993 | Rynbrandt et al. |
| 5,238,592 A | 8/1993 | Stankowiak et al. |
| 5,282,590 A | 2/1994 | Zwick |
| 5,308,159 A | 5/1994 | Misuraca |
| 5,362,150 A | 11/1994 | Taylor |
| 5,376,293 A | 12/1994 | Johnston |
| 5,387,359 A | 2/1995 | Himmrich et al. |
| 5,435,930 A | 7/1995 | Chan et al. |
| 5,496,482 A | 3/1996 | Bettermann et al. |
| 5,516,423 A | 5/1996 | Conoby et al. |
| 5,823,670 A | 10/1998 | Rushing et al. |
| 6,540,934 B2 | 4/2003 | Sapienza et al. |
| 6,596,189 B1 | 7/2003 | Moles et al. |
| 6,623,657 B1 | 9/2003 | Berglund et al. |

FOREIGN PATENT DOCUMENTS

| | | |
|---|---|---|
| GB | 467361 | 3/1936 |
| GB | 1422887 | 1/1976 |

* cited by examiner

*Primary Examiner*—Anthony J Green
(74) *Attorney, Agent, or Firm*—MH2 Technology Law Group LLP

(57) ABSTRACT

An apparatus and method for preparing and dispensing a liquid deicer. The apparatus and method allow deicer ingredients or precursors to be combined in an exothermic reaction to produce a heated deicer at the location where it will be used. In one implementation, potassium hydroxide and acetic acid are combined using the apparatus and method to make hot potassium acetate for use in numerous deicer applications, including deicing of airport runways.

16 Claims, 4 Drawing Sheets

METHOD AND APPARATUS FOR ON-SITE MIXING OF LIQUID DEICER

CROSS REFERENCE TO RELATED APPLICATIONS

This application is a continuation of U.S. patent application Ser. No. 10/302,759 filed Nov. 22, 2002, now U.S. Pat. No. 7,168,844 issued on Jan. 30, 2007, entitled "Method and Apparatus for On-Site Mixing of Liquid Deicer," which is incorporated herein by reference.

TECHNICAL FIELD

The present invention is directed to apparatuses and methods for making deicing compositions, as well as to deicer compositions made use the apparatuses or methods. In particular, the invention is directed to apparatuses and methods for making heated deicing compositions on-site at locations where the deicer will be applied, and to such heated deicing compositions.

BACKGROUND

Liquid deicer compositions are used for many applications, such as deicing roadways, bridges, machinery, airport runways, and aircraft. One of the most important criteria for some deicers, in particular those used in airport applications, is that they be non-corrosive because they are used near corrosion sensitive equipment. Today, modem airports in temperate climates usually have deicing programs in place that carefully deice runways. These deicing programs use liquid deicers applied at ambient temperatures, often at or below the freezing temperature of water. Although these deicing systems are in place at most modem airports, a need remains for improved deicing equipment and deicers. In particular, a need remains for deicing equipment and methods that improves on existing equipment and methods.

SUMMARY

The present invention is directed to an apparatus and method for forming a heated liquid deicer. In one implementation of the invention the apparatus includes two vessels configured and arranged for retaining deicer precursors: one vessel with an acidic liquid and one with an alkaline liquid. These liquids, when combined, undergo an exothermic reaction to produce a heated liquid deicer. For example, acetic acid and potassium hydroxide can be mixed to produce heated potassium acetate, which is an effective liquid deicer.

The apparatus generally includes a mixing vessel configured and arranged for the mixing and exothermic reacting of the acidic liquid and the alkaline liquid. The mixing vessel has an input for the acidic liquid, an input for the alkaline liquid, and an output for the heated reaction product of the acidic liquid and alkaline liquid. This heated reaction product is a heated liquid deicer. A liquid transfer mechanism in communication with the first and second vessels is also provided, and this mechanism is configured for the controlled transfer of the acidic liquid and the alkaline liquid into the mixing vessel.

The material formed using the apparatus and method is referred to herein as a deicer composition. Generally, deicer compositions are used to remove ice from a surface. However, the composition made in accordance with the invention is also suitable for use as an anti-icer that is applied to a surface before ice forms on it. The apparatus and method of the invention can also be used to make a composition that is applied before or after ice has formed. For the sake of simplicity, both such uses of the composition are referred to herein as a "deicer", unless otherwise noted. Thus, deicers referred to within this description can be used both to deice a surface or as an anti-icer for preventing ice formation. In addition, the composition can function as both a deicer and an anti-icer because it can be applied initially as a deicer, but remaining material then functions as an anti-icer after existing ice has been removed.

The above summary of the present invention is not intended to describe each discussed embodiment of the present invention. This is the purpose of the detailed description that follows.

BRIEF DESCRIPTION OF THE FIGURES

The invention will be more fully explained with reference to the following drawings.

Figure 1:
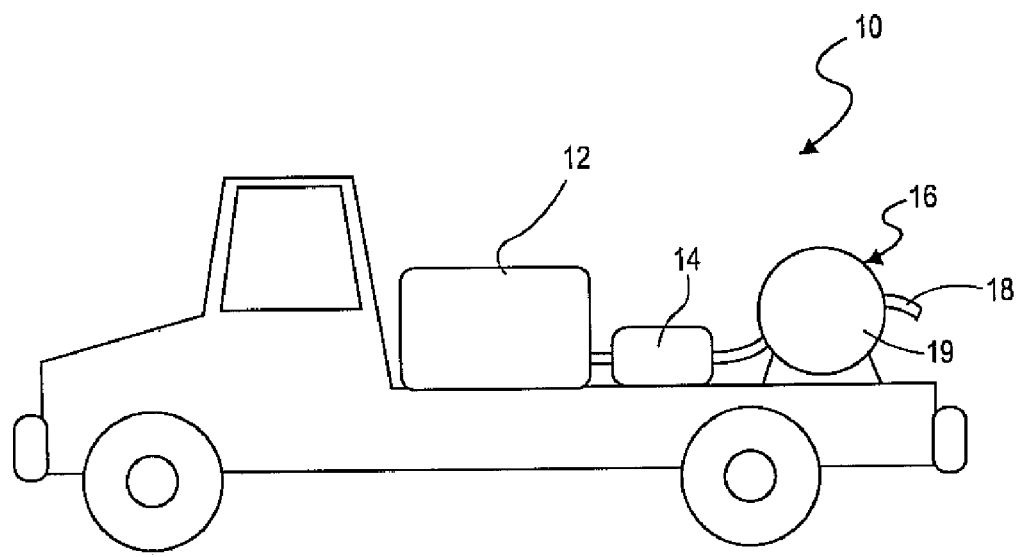
FIG. 1 is a simplified drawing of a vehicle on which a system constructed and arranged in accordance with the invention has been installed.

While principles of the invention are amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the disclosure and claims.

DETAILED DESCRIPTION

The present invention is directed to an apparatus and method for preparing and dispensing a liquid deicer. The apparatus and method allow deicer ingredients (also referred to as deicer precursors) to be combined in an exothermic reaction to produce a heated deicer. This mixing reaction typically occurs at the location where the deicer will be used. For example, potassium hydroxide and acetic acid can be combined using the apparatus and method to make hot potassium acetate for use as a deicer, such as to deice runways at airports. The hot potassium acetate functions primarily as a chemical deicer that depresses the freezing point of water, thereby causing ice to melt at temperatures below 0° C. However, the elevated temperature of the deicer provides additional deicing effect.

In one implementation, the present invention includes a first vessel configured and arranged for retaining and dispensing an acidic liquid and a second vessel configured and arranged for holding and dispensing an alkaline liquid. A third vessel is configured and arranged for the mixing and exothermic reacting of the acidic liquid and the alkaline liquid. This mixing vessel has an input for the acidic liquid, an input for the alkaline liquid, and an output for the heated reaction product of the acidic liquid and the alkaline liquid, this reaction product being a liquid deicer. In addition, the invention includes a liquid transfer mechanism, such as one or more pumps, in communication with the first and second vessels. This liquid transfer mechanism is configured for the controlled transfer of the acidic liquid and the alkaline liquid into the mixing vessel.

Figure 2A:
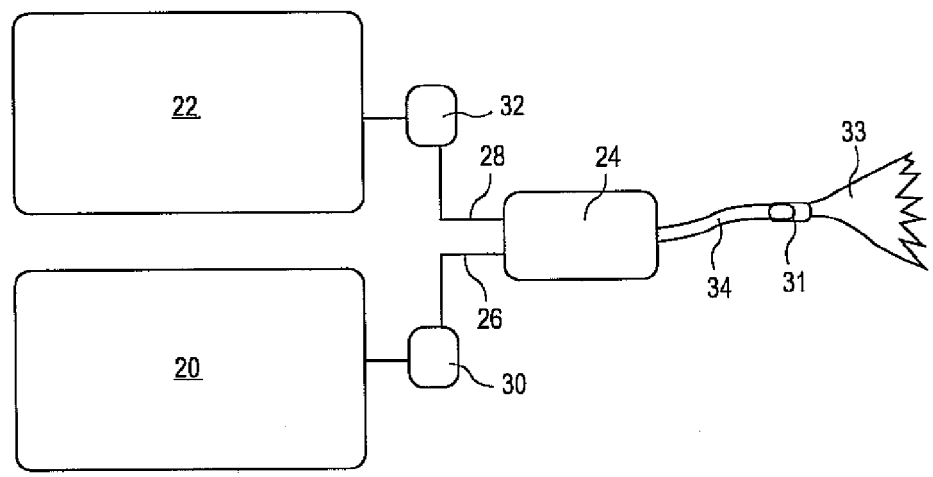
FIG. 2A is a general schematic diagram of a system constructed and arranged in accordance with a first implementation of the invention.

This system is shown generally in FIG. 1 and more specifically in FIG. 2A. In FIG. 1, the system 10 is shown with a tank 12 containing a deicer precursor (such as potassium hydroxide or acetic acid). This tank 12 connects to a mixing vessel 14. Another tank, not shown, containing a different precursor would also connect to mixing vessel 14. The two precursors mix in chamber 14 and then travel on to an optional dispenser 16 that generally includes at least one nozzle 18 used to spray the deicer onto a surface or object that is to be deiced. In some implementations the nozzle is at the end of a hose contained on a spool 19, which provides greater flexibility in applying deicer to large objects or surfaces. In certain embodiments the heated deicer formed using the system is pumped up a boom in order to be sprayed on elevated objects.

The various elements of this system are depicted schematically in FIG. 2A. First vessel 20 is configured and arranged for retaining and dispensing an acidic liquid and second vessel 22 is configured and arranged for holding and dispensing an alkaline liquid. A third vessel 24 is configured and arranged for the mixing and exothermic reacting of the acidic liquid and the alkaline liquid. This mixing vessel 24 is connected by a liquid carrying line 26 (such as a hose or pipe) to the first vessel 20 and by liquid carrying line 28 (also a hose or pipe, for example) to second vessel 22. A liquid transfer mechanism consisting of pumps 30 and 32 is used to controllably move liquid deicer precursors from the two vessels 20, 22 into the mixing vessel 24. This liquid transfer mechanism is configured for the controlled transfer of the acidic liquid and the alkaline liquid into the mixing vessel 24. After being mixed, liquid deicer flows out of the mixing vessel and out a nozzle 31 as spray 33. In the embodiment depicted in FIG. 2A this liquid moves through a hose 34, but it will be appreciated that this hose is optional and other ways of dispensing the liquid deicer are appropriate.

Figure 2B:
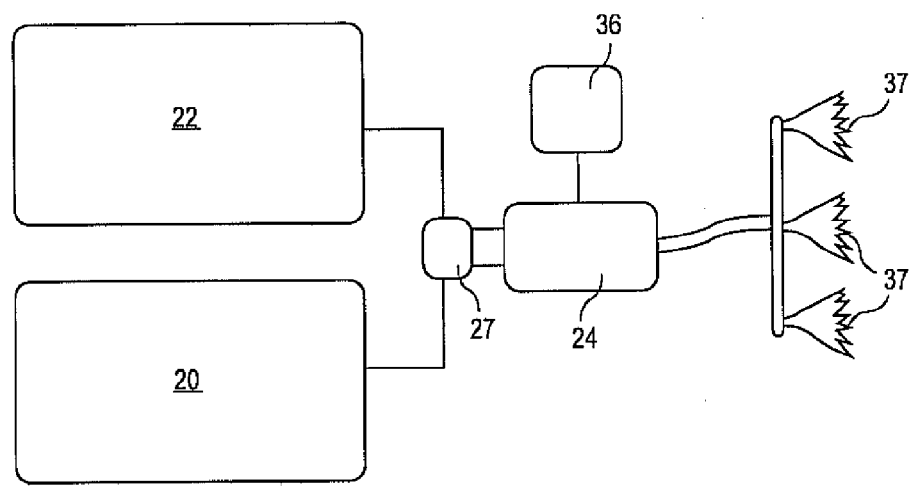
FIG. 2B is a general schematic diagram of a system constructed and arranged in accordance with a second implementation of the invention.

FIG. 2B shows an alternative embodiment of a system for creating a heated deicer. This system is similar to the one depicted in FIG. 2A, but contains one pump 27 rather than the two pumps 30, 32. Although this system has just one pump, the pump simultaneously pumps the two liquids without mixing them together. Not until the liquids reach the mixing vessel 24 do they come together to react and form the liquid deicer. FIG. 2B also shows an additional tank 36. This tank 36 contains a corrosion inhibitor that can be added to the deicer so that the deicer is less corrosive to surfaces and objects on which it is applied.

The two example apparatuses disclosed in FIGS. 2A and 2B represent two acceptable implementations of how an apparatus can be constructed in accordance with the invention. However, various changes, additions, and subtractions can be made from the two depicted apparatuses. For example, various nozzle configurations are possible, and some implementations do not even use a nozzle. Also, various pressure release mechanisms may be added to the mixing vessels, as well as control systems for regulating the mixing of the two deicer precursors. Thus, FIGS. 2A and 2B show examples of how the present invention may be practiced, but are not limiting in that regard.

One of the key elements of the present invention is the mixing vessel. The mixing vessel can be, and typically is, smaller than the primary chambers containing the unmixed acidic and alkaline liquids. The purpose of the mixing vessel is not to retain large volumes of mixed deicer, but rather to provide a temporary location in which the exothermic reaction between the two ingredients can occur, after which the resultant liquid deicer is applied to a surface. In most implementations the mixing vessel or chamber is constructed to allow the highly exothermic acid-base reaction to progress to completion or nearly to completion. It is important that this reaction proceed to completion or near completion before the deicer is dispensed because it is normally not desirable to have non-reacted precursors discharged from the apparatus due to their corrosive natures.

The mixing vessel is generally constructed in a fashion that allows it to withstand the high temperatures, and also to withstand steam generated during the exothermic reaction. Certain implementations require the mixing vessel to withstand pressures developed by the exothermic reaction, while other implementations provide one or more vents or pressure release valves to release this pressure. One way of handling steam generated within the mixing vessel is to permit it to escape or venting through a release valve. Another way of handling the steam is to use it to force the mixed deicer through an exit in the mixing vessel. In this manner the steam and vapors can be used to generate pressure. Alternatively, the steam can be partially vented and partially used to force the mixed deicer through the exit.

As noted above, the mixing vessel should have a configuration that allows for the acidic and alkaline liquids to be rapidly and safely mixed together. Numerous configurations are within the scope of the present invention, including elongate chambers, some of which can be formed of a long, relatively narrow pipe. In some implementations the mixing vessel contains one or more static mixing vanes. Alternatively, a stirring means can be used, such as a rotating prop or blade.

Figure 3A:
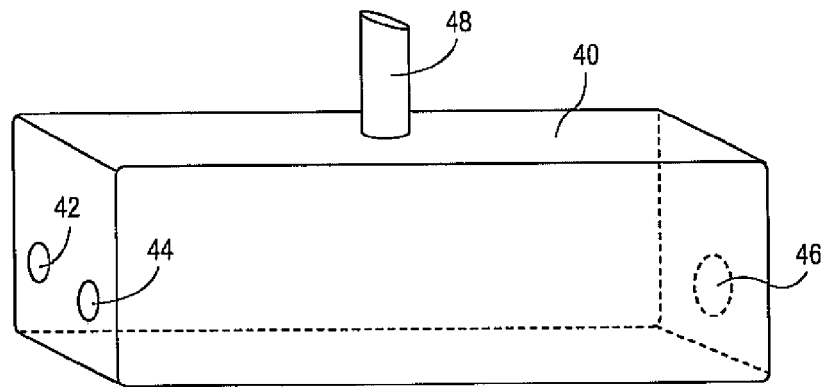
FIG. 3A is a simplified drawing of a first mixing vessel constructed and arranged in accordance with the invention.

The invention covers numerous implementations in which different vessel configurations are used. The vessel can be as simple as the convergence of two pipes carrying deicer precursors into a third pipe that will discharge the deicer onto a surface, or can be relatively complex. In a first embodiment, shown in FIG. 3A the vessel comprises a substantially enclosed chamber 40 that has inputs 42, 44 and an outlet 46. A release vent 48 is also depicted, the release vent configured to permit the escape of excess pressure. When such pressure is released, it typically includes the release of steam along with incidental amounts of liquids. However, in certain circumstances it is possible that larger amounts of liquids will be released, in which case it is desirable that the liquids comprise mixed deicer as opposed to precursor ingredients. When a release vent is used it is preferable that the vented gas or liquids be discharged away from where persons are likely to be positioned. Thus the optional release vent is often positioned at the end of the chamber most distant from the input streams, thereby promoting the thorough reaction of any incidentally discharged materials.

Figure 3B:
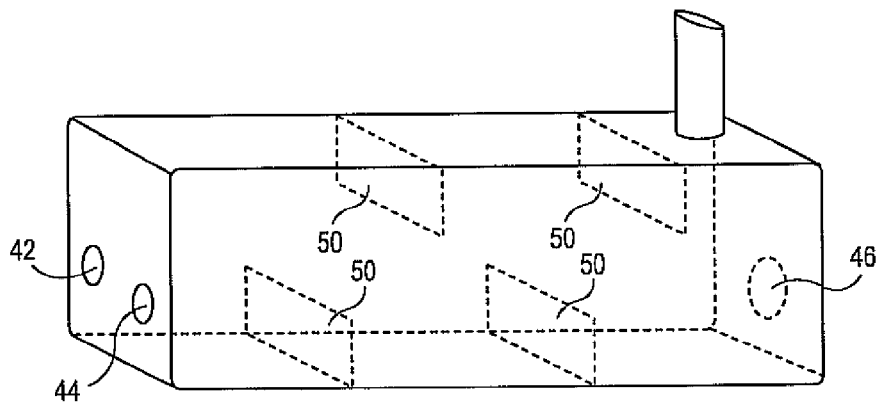
FIG. 3B is a simplified drawing of a second mixing vessel constructed and arranged in accordance with the invention.

An alternative embodiment is shown in FIG. 3B, where a plurality of static fins 50 is positioned within chamber 40. The static fins 50 promote the thorough mixing of the deicer precursors by stirring the precursors together as they pass through the chamber. The heat (and sometimes steam) generated by the exothermic reaction of the precursors also helps to promote movement and stirring of the ingredients.

Figure 3C:
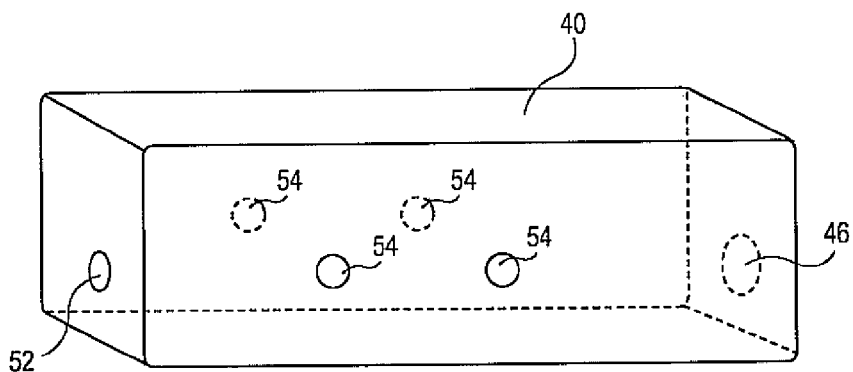
FIG. 3C is a simplified drawing of a third mixing vessel constructed and arranged in accordance with the invention.

In many implementations of the invention the acid liquid and alkaline liquid are rapidly mixed together at one junction. However, in other implementations the reaction is attenuated by slowly mixing the two liquids together. An example of how such gradual mixing can be accomplished is shown in FIG. 3C, which has a chamber with a single entrance for one liquid (either the acid or the alkaline liquid) plus multiple entrances 54 for the other liquid. Thus, in some implementations the apparatus includes a mixing vessel having multiple inputs for the alkaline liquid. In other implementations the mixing vessel has multiple inputs for acid liquid. This gradual mixing approach is suitable for various implementations, particularly when one of the ingredients is highly concentrated.

Figure 4A:
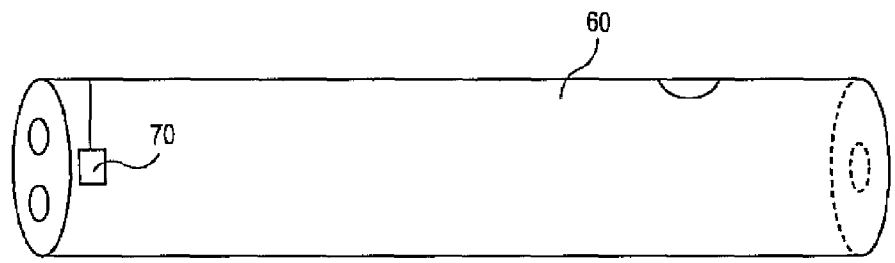
FIG. 4A is a simplified drawing of a first mixing vessel constructed and arranged in accordance with the invention.
Figure 4B:
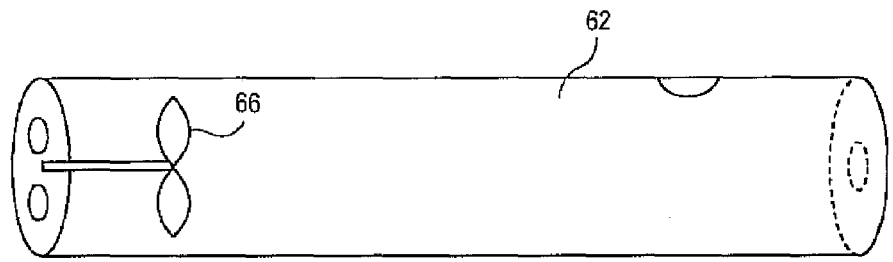
FIG. 4B is a simplified drawing of a second mixing vessel constructed and arranged in accordance with the invention.
Figure 4C:
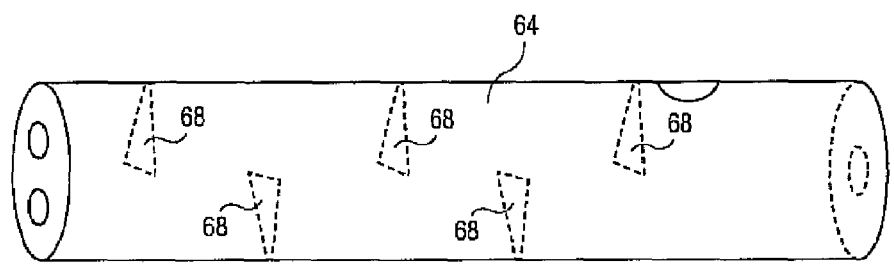
FIG. 4C is a simplified drawing of a third mixing vessel constructed and arranged in accordance with the invention.

Additional implementations are shown in FIGS. 4A, 4B, and 4C, which depict long, narrow mixing chambers. Such chambers can be constructed, for example, from segments of stainless steel pipe. The chamber of FIG. 4A is long and narrow, but without internal mixing vanes. Such implementations are suitable for circumstances where the length of the chamber is long enough to have thorough mixing merely by the turbulence generated within the chamber by movement of the liquids and by the warming of the liquids as a result of the exothermic reaction. In FIG. 4B a similar chamber 62 is depicted, but this chamber 62 also contains a rotating stirrer 66 to promote mixing. FIG. 4C shows yet another implementation with a chamber 64 having multiple mixing vanes 68. These mixing vanes 68 are constructed so as to stir the liquid as it passes through the chamber, thereby promoting reaction.

An alternative means for mixing the acid and alkali deicer precursors is by an impingement mechanism that directs streams of the precursors together so that that they adequately react. For example, two nozzles can be placed adjacent to one another, one nozzle with an acid and one with an alkali, and the streams from each nozzle are directed toward each other to cause mixing of the precursors to form a heated deicer. In such implementations a vessel or chamber is not necessarily used to mix them, although it is possible to impinge the two liquids within a chamber to promote mixing.

As noted above, the invention typically includes a transfer mechanism for moving the acid and alkaline liquids from their storage containers into the mixing vessel or chamber. In general such transfer mechanism will include one or more pumps. However, gravity fed systems can also be used, as can other systems that can move a regular, metered amount of liquid from one tank into the other. The liquid transfer mechanism can comprise a first pump connected to the first vessel and a second pump connected to the second vessel.

Various acidic liquids are useful with the invention, including, but not limited to, hydrochloric acid, formic acid, adipic acid, sulfuric acid, maleic acid, acetic anhydride, maleic anhydride, propionic acid, lactic acid and acetic acid. One particularly desirable acidic liquid is acetic acid. Similarly, various alkaline liquids are useful with the invention, and include but are not limited to sodium hydroxide, calcium hydroxide, magnesium hydroxide, potassium hydroxide, ammonia, calcium oxide, magnesium oxide, calcium hydroxide, and ammonium hydroxide. One particularly desirable alkaline liquid comprises potassium hydroxide. Normally from 25 to 75 percent concentrations of each reactant can be used, but concentrations of 100% such as glacial acid in some embodiments are contemplated.

The deicer produced using the present invention is typically a potassium acetate solution made from the mixing of potassium hydroxide and acetic acid. Other deicers that can be produced include, but are not limited to, ammonium acetate, ammonium formate, ammonium propionate, sodium acetate, sodium formate, sodium propionate, potassium formate, potassium propionate, and potassium citrate.

In most implementations it is necessary that the acidic and alkaline materials be combined in acid/base equivalents, which is typically equimolar quantities, to promote a complete reaction of both materials. An excess of either composition can result in an undesirably corrosive deicer composition. The apparatus and method typically include one or more aspects that promotes and ensures that proper amounts of each precursor liquid (the acid and alkali) are added in proper quantities. The primary manner in which such control is maintained is typically by having a transfer mechanism that accurately transfers the two (or more) precursors. Thus, when one or more pumps are used they should be accurate and reliable. It is desirable in some implementations to have a single pump mechanism transfer both the acidic liquid and the alkaline liquid, such as by having a single shaft drive two piston pumps, one corresponding to each liquid. Having a single pump mechanism is advantageous because it assures that the two liquids will be pumped simultaneously. This avoids inadvertent transfer of one liquid while the other liquid is not being transferred.

Another aspect of the invention can include a controller for regulating the transfer mechanism, the controller configured to regulate the relative flows of acidic liquid and basic liquid such that the reaction product leaving the mixing vessel has a substantially neutral pH. Alternatively, the controller can be configured to regulate the relative flows of acidic liquid and basic liquid such that the reaction product leaving the mixing vessel has a pH substantially equal to the pH of a solution having the complete neutralization of the acidic and basic liquids. In yet another implementation the controller is configured to regulate the relative flows of acidic liquid and basic liquid such that the reaction product leaving the mixing vessel has a pH from about 4 to about 11.

In some such implementations the apparatus includes a sensor 70 for determining the concentration of the alkaline liquid, the acidic liquid, or both. Also, in some implementations the apparatus includes a sensor and feedback loop that shuts the system down when the mixing of the acid and alkali are not complete. For example, a pH feedback loop may be incorporated into certain implementations of the system. This pH feedback loop measures the pH of the deicer as it exits the apparatus, and the system shuts down when the pH moves outside of desired parameters.

The apparatus of the invention normally also contains at least one nozzle in liquid communication with the mixing vessel, the nozzle configured to discharge the heated reaction product of the acidic liquid and alkaline liquid. The nozzle may include just one hole, or can include a plurality of holes. In most implementations the reaction product is discharged under pressure through this nozzle or nozzles, and the pressure is developed at least in part by the reaction of the acidic liquid and alkaline liquid.

In some implementations of the invention the deicer is formed from a combination of precursors plus premixed deicer. For example, the deicer can include the precursors that are mixed together and then added to premixed deicer. This implementation has the advantage of warming the premixed deicer to a higher temperature, although typically not to the temperature reached by using just the deicer precursor materials.

In certain implementations corrosion inhibitors are added to the deicer in order to prevent corrosion of objects that are being deiced (such as airport runways) and surrounding objects in the environment (such as iron reinforcements in the concrete). Numerous suitable corrosion inhibitors are appropriate for use with the present invention, and include phosphates, amines, nitrates, and silicates. These corrosion inhibitors can be used individually or in combination with one another. The inhibitors can be pre-added to the vessel containing the acidic liquid, pre-added to the vessel containing the alkaline liquid, or both. Alternatively, the corrosion inhibitor may be added to the acid/base mixture from a tank containing the corrosion inhibitor by means of a metering pump.

It is typically important to control the amount of each of the liquids being mixed. Such controls can be accomplished by having a static system that mixes preset amounts of the liquids together based upon their original concentration. Alternatively, sensors can be placed in the input flow streams, the output stream, or both to measure the concentration of incoming materials and outgoing materials to assure that a proper mixture is obtained. Sensors providing feedback with regard to the mechanical, electrical, thermal, pH, conductivity or other properties of the liquid precursors or the mixed deicer can be included. These sensors function with the control system to ensure that adequate amounts of precursors are safely mixed together properly and fully to make a suitable deicer.

This deicing system can also be used on bridges or any paved surface that requires deicing. Typically this deicing system is used on a mobile basis, but can also be a stationary system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

We claim:

1. An apparatus for forming a heated liquid deicer, the apparatus comprising:
    a first vessel for retaining and dispensing an acidic liquid precursor comprising acetic acid;
    a second vessel configured and arranged for holding and dispensing an alkaline liquid precursor comprising potassium hydroxide;
    a mixing vessel of a smaller size than each of the first and second vessels for the mixing and temporary exothermic reacting location of the acidic liquid precursor and the alkaline liquid precursor, said mixing vessel comprising an input for the acidic liquid precursor comprising acetic acid, an input for the alkaline liquid precursor comprising potassium hydroxide, and an output for a heated reaction product generated by the exothermic reacting of the acidic liquid precursor and alkaline liquid precursor, said heated reaction product comprising a liquid deicer containing potassium acetate; and
    a liquid transfer mechanism in communication with the first and second vessels, said liquid transfer mechanism configured for controlled transfer of the acidic liquid precursor and the alkaline liquid precursor into the mixing vessel.

2. The apparatus of claim 1, wherein the output heated reaction product comprises fully reacted precursors.

3. The apparatus of claim 1, further comprising at least one pressure release vent formed in the mixing vessel.

4. The apparatus of claim 3, wherein the at least one pressure release vent is formed at an end of the mixing vessel most distant from the inputs for each of the acidic and alkaline liquid precursors, thereby promoting the thorough reaction of any incidentally discharged materials.

5. The apparatus of claim 3, wherein the at least one pressure release vent comprises a plurality of pressure release vents.

6. The apparatus of claim 1, further comprising a plurality of inputs formed in the mixing vessel, a number of inputs for each of the alkaline liquid precursor and acidic liquid precursor selected according to a rate of mixing.

7. The apparatus of claim 1, wherein the liquid transfer mechanism comprises gravity.

8. The apparatus of claim 1, wherein the acidic and alkaline liquid precursors are combined in equimolar quantities, thereby promoting a complete reaction between precursors.

9. An apparatus for forming a heated liquid deicer, the apparatus comprising:
    a first vessel configured for retaining and dispensing an acidic liquid precursor;
    a second vessel configured for holding and dispensing an alkaline liquid precursor;
    means, of a smaller size than each of the first and second vessels, for mixing and providing a temporary exothermic reaction location for the acidic liquid precursor and the alkaline liquid precursor, the means for mixing comprising an input for acidic liquid precursor, an input for alkaline liquid precursor, and an output for a heated reaction product of the acidic liquid precursor and alkaline liquid precursor generated by the exothermic reaction; and
    a liquid transfer mechanism in communication with the first and second vessels, said liquid transfer mechanism configured for controlled transfer of the acidic liquid precursor and the alkaline liquid precursor into the means for mixing.

10. The apparatus of claim 9, wherein the output heated reaction product comprises fully reacted liquid precursors.

11. The apparatus of claim 9, further comprising at least one pressure release vent formed in the means for mixing.

12. The apparatus of claim 11, wherein the at least one pressure release vent is formed at an end of the means for mixing most distant from the inputs for each of the acidic and alkaline liquid precursors, thereby promoting the thorough reaction of any incidentally discharged materials.

13. The apparatus of claim 11, wherein the at least one pressure release vent comprises a plurality of pressure release vents.

14. The apparatus of claim 9, further comprising a plurality of inputs formed in the means for mixing, a number of inputs for each of the alkaline liquid precursor and acidic liquid precursor selected according to a rate of mixing.

15. The apparatus of claim 9, wherein the liquid transfer mechanism comprises gravity.

16. The apparatus of claim 3, wherein the acidic and alkaline precursors are combined in equimolar quantities, thereby promoting a complete reaction between precursors.

* * * * *